United States Patent Office 3,430,159
Patented Feb. 25, 1969

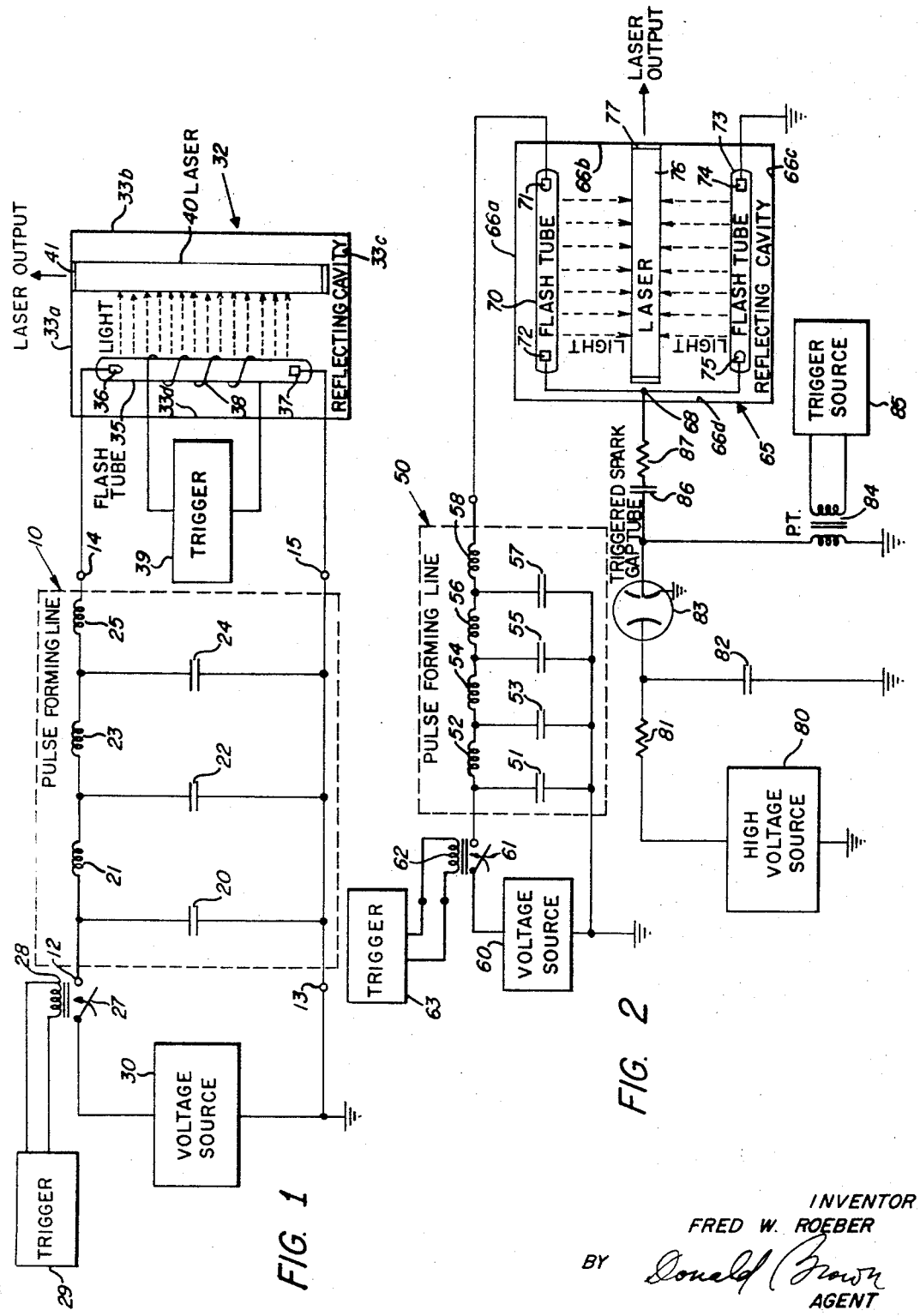

3,430,159
FLASHTUBE TRIGGERING CIRCUITS
Fred W. Roeber, Southboro, Mass., assignor to Raytheon Company, Lexington, Mass., a corporation of Delaware
Filed Nov. 14, 1963, Ser. No. 323,666
U.S. Cl. 331—94.5                8 Claims
Int. Cl. H01s 3/09; H05b 41/14

ABSTRACT OF THE DISCLOSURE

A flashtube triggering circuit for providing light energy comprising a voltage source, a pulse forming line comprising a plurality of L-C sections coupled to the voltage source, and one or more flashtubes coupled to the pulse forming line.

---

This invention relates to high intensity light sources and, more particularly, to devices for providing energy to and triggering of a pump source such as a flashtube.

In the past, workers of the prior art have found considerable difficulty in providing energy to discharge a high intensity flashtube which is particularly suitable for pumping lasers of the ruby rod type. Furthermore, stable controlled pulsing of lasers has not, as yet, been solved by the prior art devices. For pumping lasers, it is required that the flashtube provide a fast rise time burst of high intensity light energy within a short period of time with substantially a square or rectangular output. Difficulty has been particularly encountered in attempting to provide high energy in the order of kilovolts to flashtubes primarily due to the characteristic low resistance of the flashtube which is in the order of .4 ohm. Additionally, the requirement for critically damping flashtubes, so that ringing of the energy can be prevented, and the requirement for driving the flashtube at its maximum permissible current levels, so as to provide maximum instantaneous light intensity rather than a slow build up of a light intensity, has presented major obstacles in laser pumping applications. A slow build up of light intensity is believed to be the cause of laser pumping instability.

Additionally, workers of the prior art have found it difficult to trigger a series configuration of flashtubes, so as to provide the high intensity light required to pump a laser of the ruby rod type. Prior triggering of a single flashtube has been accomplished by the use of a secondary winding, in series with the anode of a flashtube, in order to raise the potential for a short period of time necessary to ionize the gaseous atmosphere within the tube so as to provide a low resistance path through the tube and subsequent discharge of the energy storage bank through the tube. Others have triggered flashtubes with a winding surrounding a portion of the tube, which is energized to ionize the gaseous atmosphere, so as to produce a low resistance path through the tube and, accordingly, triggering of the flashtube network. However, none of the above schemes provide for simultaneously triggering a series connected pair of flashtubes by applying a voltage at a single common connection.

Accordingly, it is a primary object of this invention to provide a new and improved means for providing energy to a pump source such as a flashtube.

It is a further object of this invention to provide a new and useful means for triggering a series configuration of flashtubes.

It is a further object of this invention to apply pulse forming techniques to a flashtube energizing circuit.

In accordance with this invention, a pulse forming line or network, comprising a plurality of L-C sections, is coupled to a pump source to provide a means for efficiently supplying energy and shaping the pulse of energy applied to said pump source. More particularly, a voltage source is provided for charging to a predetermined voltage, a pulse forming line comprised of a plurality of L-C sections. After the pulse forming line is charged to the predetermined voltage, the pulse forming line is discharged through the low resistance path of a triggered flashtube. This, then, provides a high intensity burst of light from a flashtube which is of substantially a rectangular wave shape, thereby providing a high intensity light output to pump a laser device.

In addition, this invention particularly describes a device for triggering a series chain of pump sources, such as flashtubes and comprises means for applying a high voltage to ionize the gas in one of a plurality of flashtubes from cathode to anode of the flashtube and for ionizing the gas in another one of said plurality of flashtubes from anode to cathode, thereby permitting substantially simultaneous triggering of a plurality of series coupled flashtubes with a single trigger.

Other objects and features of this invention will become apparent from the following description taken in connection with the following drawings wherein:

FIG. 1 is a circuit diagram of a pulse forming line in combination with a flashtube to provide a high intensity light output to pump a laser; and FIG. 2 is a circuit diagram of a triggering device for triggering a series combination of flashtubes in accordance with this invention.

Referring now to FIG. 1, there is disclosed a pulse forming line in combination with a voltage source and flashtube in accordance with this invention. The pulse forming line 10 comprises a plurality of L-C sections composed of a first inductor 21 and capacitor 20 in an L or half T arrangement coupled at one end to a common point. A second L-C section comprised of a capacitor 22 and an inductor 23 is connected at a common point to one end of inductor 21. A third L-C section comprised of a capacitor 24 and an inductor 25, coupled at a common point, is connected at one end of the inductor 23. These capacitor and inductor combinations comprise the pulse forming line of this invention.

For a more detailed description of pulse forming lines or networks, see the text, "Principles of Radar," by Rentjes and Coate, chapter III, pp. 154–166 which was published by McGraw-Hill Book Company, Inc. in 1952.

The pulse forming line of this invention is utilized to obtain a pulse having a length in the order of several hundred microseconds to as long as several seconds. The pulse, provided from the pulse forming line, is particularly adapted to produce a maximum transient response upon discharge of the line so as to pump a laser with an initial high intensity burst of light energy.

The pulse forming line 10 is coupled to a pair of input terminals 12 and 13 and a pair of output terminals 14 and 15. Input terminal 12 is connected to a relay switch 27 which is operated by a winding 28 coupled to a trigger source 29. A voltage source 30 is coupled to ground and input terminal 13 and to the relay switch 27. By closing the relay 27, the voltage source 30 provides a voltage across the pulse forming line so as to charge up the capacitors 20, 22 and 24. The output terminals of the pulse forming line are coupled to a flashtube 35 at the anode 36 and at the cathode 37, respectively. The flashtube 35 contains an ionizable gas or gaseous atmosphere such as xenon. A trigger source 39 is shown for providing a signal to a winding 38 wound around a portion of the flashtube 35 so as to ionize the xenon gas, thereby providing a low resistance path across the output terminals 14 and 15 so as to discharge the pulse forming line.

The flashtube 35 is mounted in a reflecting cavity 32 having reflecting walls 33a, 33b, 33c and 33d. Mounted in the same cavity 32 is a laser 40. The flashtube, upon discharge of the pulse forming line into it, produces a highly intense pulse of light energy which pumps the laser 40 so as to invert the population of the laser 40, thereby ultimately producing a laser output from end 41 of laser 40. The laser 40, as shown in FIG. 1, could be of the ruby rod type having its ends prepared to form a Fabry-Perot cavity. A typical example of a pulse forming line could comprise a circuit with the following values of capacitance, inductance and voltages:

| | |
|---|---|
| Capacitors 20, 22, 24 _____µf__ | 600 |
| Inductors 21, 23, 25 _____µf__ | 300 |
| Voltage source 30 _____kv__ | 4 |
| Trigger source 39 _____volts__ | 20,000 |

This circuit provides a pulse duration of 2,550 microseconds and a damping factor of .67 when connected to an Edgerton, Germeshausen, and Grier, Inc. FX-47 type flashtube.

The circuit of this invention operates in the following manner: A pulse forming trigger 29 closes relay switch 27 so as to connect the voltage source 30 across the input terminals 12 and 13 of the pulse forming line 10. This, then charges the capacitors 20, 22 and 24 after a period of time to a voltage substantially equal to the voltage provided by source 30. After a sufficient period of time for this charging action to occur, relay switch 27 is opened. At this time, a trigger voltage is provided by trigger 39 so as to cause the gaseous atmosphere wherein the flashtube 35 to ionize. The ionization of the gaseous atmosphere within the flashtube provides a low resistance shunt across the pulse forming line 10. This, then, permits the pulse forming line to discharge through the flashtube 35 to provide a burst of light energy substantially of a rectangular shape. This energy is then transmitted via light waves to impinge upon the laser 40. Additionally, the light energy transmitted from the flashtube is reflected towards the laser by the reflecting walls of the cavity 32. After a period of time, the population of the ruby rod laser 40 has been inverted and oscillations begin to occur and a laser output is obtained at end 41.

Thus, by the use of a pulse forming line to provide energy to a flashtube, a transient response is obtainable which permits maximum efficiency of light transmission from the flashtube to occur, thereby providing superior pumping and output response from a laser. Furthermore, the use of a pulse forming line shapes the output wave from the discharging capacitors such that there is significant reduction in the ringing of the energy provided to the flashtube, thereby concentrating the output light from the flashtube into a substantially rectangular output signal. Furthermore, the use of a pulse forming line permits the flashtube peak current to remain lower due to the use of critical damping provided by the line. This prevents failure of flashtubes due to excessive currents. Furthermore, the use of a pulse forming line permits the low impedances in the order of 0.4 ohm to be closely and easily matched so as to provide maximum efficiency of energy transfer.

In FIG. 2, there is disclosed a triggering scheme for simultaneously ionizing the gaseous atmosphere within a pair of series coupled flashtubes, said series coupled flashtubes are shown in FIG. 2 providing energy from a bank of energy represented by a pulse forming line. A reflecting cavity 65 is shown having reflecting walls 66a, 66b, 66c and 66d. Mounted within said cavity is a first flashtube 70 having an anode 71 and a cathode 72. The flashtube 70 has an ionizable gas therein, such as xenon. A second flashtube 73 is disclosed of the same type flashtube 70 mounted in a spaced relationship to said flashtube 70. Flashtube 73 has an anode 75 and a cathode 74. Cathode 74 is coupled to ground and anode 75 is coupled to cathode 72 of flashtube 70. A laser 76, which could be of the ruby type, is shown disposed between flashtubes 70 and 73. Upon activation of flashtubes 70 and 73, an intense light is produced which causes the ruby rod to produce a population inversion and subsequently a laser output signal to be transmitted from end 77. Triggering of this series flashtube combination is accomplished by providing a high voltage at point 68, said point 68 being the common connection of cathode 72 of flashtube 70 and anode 75 of the flashtube 73. A high voltage applied at this point will ionize the gaseous atmosphere within flashtube 70 by breaking down the gas within flashtube 70 from cathode to anode and simultaneously will break down the gaseous atmosphere within flashtube 73 by the potential between the anode and cathode of flashtube 73. Thus, one flashtube; namely, flashtube 70, will exhibit a gaseous breakdown from cathode to anode and the other series flashtube will substantially simultaneously exhibit a breakdown from anode to cathode. By providing this series arrangement, it is possible to provide current from a single source to energize a series pair of flashtubes simultaneously and thereby produce an intense output signal. Series coupling of flashtubes for pumping lasers provides a significant improvement in light intensity output over parallel connected tubes inasmuch as maximum energy flows through the series pair while energy would divide through a parallel pair connected to a single source of energy. Further, the use of a series pair of flashtubes increases the impedance of flashtube elements thereby allowing better impedance matching of the pair to a pulse forming line. The high voltage is provided in the following manner: A high voltage source 80 charges a capacitor 82 through a resistor 81. After a period of time, a triggered spark gap tube switch 83 is energized by a trigger source 85 applying a signal to the pulse transformer 84 to cause the spark gap tube to conduct. This, then, provides a rapid discharge of capacitor 82 through capacitor 86 and resistor 87 which are coupled to point 68, thereby ionizing the gaseous atmosphere within flashtubes 70 and 73.

The following values are given for purposes of example so as to disclose a system for triggering a series flashtube configuration:

| | |
|---|---|
| Voltage source 80 _____kv__ | 18 |
| Resistor 81 _____meg__ | 3 |
| Capacitor 82 _____µf__ | .1 |
| Capacitor 86 _____µµf__ | 500 |
| Resistor 87 _____ohms__ | 1-2 |

The spark gap tubes could be the type sold by Edgerton, Germeshausen and Grier, Inc., Model GP-12.

To provide energy to cause the flashtube to produce a high intense light output, a pulse forming line 50, comprising four L-C sections, comprised of capacitor 51, inductor 52, capacitor 53, inductor 54, capacitor 55, inductor 56 and capacitor 57 and inductor 58 is disclosed. Energy to charge up this pulse forming line is provided by a voltage source 60 coupled to the pulse forming line 50 through a relay switch 61. A trigger 63 is shown for providing a signal 62 to close relay switch 61. A typical circuit, having the following values, could be utilized to provide energy to the series flashtube pair:

| | |
|---|---|
| Voltage source 60 _____kv__ | 5.7 |
| Capacitors 51, 53, 55, 57 _____µf__ | 300 |
| Inductors 52, 54, 56, 58 _____µh__ | 300 |

This circuit, in conjunction with this series flashtube pair, will provide a circuit having a damping factor of .8 and a pulse duration of 2,400 microseconds. Thus, a series flashtube pair has been disclosed which not only permits ease of triggering due to the possibility of obtaining simultaneous breakdown of two devices by discharging a capacitor to raise the voltage across the tube to the point of ionization, but the use of a series pair of flashtubes increases the load impedance and, thus, permits a pulse forming line to more readily provide optimum performance of discharge through the flashtube.

While our preferred embodiments have been illustrated

What is claimed is:

1. A device for providing light energy comprising input terminals, a pulse forming line coupled to said input terminals, output terminals coupled to said line, said pulse forming line comprising a plurality of capacitor-inductor sections, and a flashtube coupled to said output terminals.

2. A laser pumping system comprising a voltage source, a pulse forming line comprising a plurality of L–C sections coupled to said source, and a flashtube coupled to said line for providing light to pump a laser.

3. In combination, a voltage source, a plurality of L–C sections coupled so as to comprise a pulse forming line coupled to said source, a flashtube having a gaseous atmosphere, anode and a cathode coupled to said pulse forming line, a laser, said laser and flashtube both mounted in a cavity, and means for ionizing said gaseous atmosphere to discharge said line thereby pumping said laser.

4. A system comprising a source of energy, a pulse forming line comprised of a plurality of L–C sections coupled in an L configuration, said line coupled to said source of energy, a flashtube having an anode, a cathode and an ionizable gas therein, said anode and cathode coupled to the output of one said L–C sections, a laser, a reflecting cavity, both said flashtube and said laser mounted within said cavity, and means for ionizing the ionizable gas thereby providing a fast rise time pulse of light energy from said flashtube to initiate a laser output signal from said laser.

5. In combination, a first flashtube having a cathode, anode, and a gaseous atmosphere therein, a second flashtube also having a cathode, anode, and a gaseous atmosphere therein, said anode of said first flashtube coupled to the cathode of said second flashtube, a source of energy including a pulse forming line coupled to the anode of said second flashtube and the cathode of said first flashtube, and means for ionizing the gaseous atmosphere within said first and second flashtubes, said last means coupled to the anode of said first flashtube and the cathode of said second flashtube.

6. A combination in accordance with claim 5 wherein said last means comprises a voltage source a capacitor coupled to said voltage source and a switch coupled between said capacitor and said flashtubes for controlling the discharge of said capacitor.

7. A combination in accordance with claim 6 wherein said switch comprises a spark gap tube coupled between said capacitor and the anode of said first flashtube and the cathode of said second flashtube.

8. A combination in accordance with claim 5 wherein said pulse forming line comprises a plurality of L–C sections coupled in an L configuration.

References Cited

UNITED STATES PATENTS

| 2,043,484 | 6/1936 | Miller | 315—241 |
| 2,509,005 | 5/1950 | Lord | 315—241 |
| 3,178,657 | 4/1965 | Morse | 331—94.5 |
| 3,179,897 | 4/1965 | Edgerton | 331—94.5 |

OTHER REFERENCES

"Diode Laser Transmits Audio," Electronics (May 31, 1963), p. 16.

JEWELL H. PEDERSEN, *Primary Examiner.*

W. L. SIKES, *Assistant Examiner.*

U.S. Cl. X.R.

315—241